(12) United States Patent
    Atchison

(10) Patent No.: US 11,539,923 B2
(45) Date of Patent: Dec. 27, 2022

(54) PROJECTOR SYSTEM

(71) Applicant: Nickey Joe Atchison, Boulder Creek, CA (US)

(72) Inventor: Nickey Joe Atchison, Boulder Creek, CA (US)

(*) Notice: Subject to any disclaimer, the term of this patent is extended or adjusted under 35 U.S.C. 154(b) by 0 days.

(21) Appl. No.: 17/397,788

(22) Filed: Aug. 9, 2021

(65) Prior Publication Data

US 2022/0046213 A1    Feb. 10, 2022

Related U.S. Application Data

(60) Provisional application No. 63/063,898, filed on Aug. 10, 2020.

(51) Int. Cl.
| | | |
|---|---|---|
| *H04N 9/31* | (2006.01) | |
| *G03B 21/16* | (2006.01) | |
| *G03B 21/20* | (2006.01) | |
| *G03B 21/60* | (2014.01) | |

(52) U.S. Cl.
    CPC ......... *H04N 9/3144* (2013.01); *G03B 21/16* (2013.01); *G03B 21/206* (2013.01); *G03B 21/60* (2013.01); *H04N 9/3155* (2013.01)

(58) Field of Classification Search
    CPC ............... H04N 9/3141; H04N 9/3144; H04N 9/31452; H04N 9/3155; H04N 9/3158; H04N 9/3179; G03B 21/16; G03B 21/18; G03B 21/54; G03B 21/60; G03B 21/206; G03B 21/2066
    See application file for complete search history.

(56) References Cited

U.S. PATENT DOCUMENTS

| | | | | |
|---|---|---|---|---|
| 7,806,531 | B2 * | 10/2010 | Zakoji | G03B 21/16 |
| | | | | 361/689 |
| 8,098,015 | B2 * | 1/2012 | Kotani | G03B 21/206 |
| | | | | 315/121 |
| 8,328,368 | B2 | 12/2012 | Luciano | |
| 8,403,497 | B2 * | 3/2013 | Hsiao | G03B 21/16 |
| | | | | 353/57 |
| 8,879,782 | B2 | 11/2014 | O'Brien et al. | |
| 9,405,175 | B2 | 8/2016 | O'Brien et al. | |
| 11,099,469 | B1 * | 8/2021 | Selfe | G03B 21/2066 |
| 2003/0227765 | A1 | 12/2003 | Kubo | |
| 2008/0042969 | A1 | 2/2008 | Baker | |
| 2008/0136973 | A1 | 6/2008 | Park | |
| 2012/0044467 | A1 | 2/2012 | Nakayama | |
| 2013/0249959 | A1 * | 9/2013 | Umehara | H04N 9/3144 |
| | | | | 353/52 |

* cited by examiner

*Primary Examiner* — Sultan Chowdhury
(74) *Attorney, Agent, or Firm* — Robert Brownstein

(57) ABSTRACT

The invention is a small, low-power consuming, projector system. Once programmed and provided with image data, it can be a standalone system for presenting varying length, silent, videos. Its programmability and FPGA-based microcircuitry allows it to be repurposed with minimal effort to support other embedded-light-system applications.

4 Claims, 5 Drawing Sheets

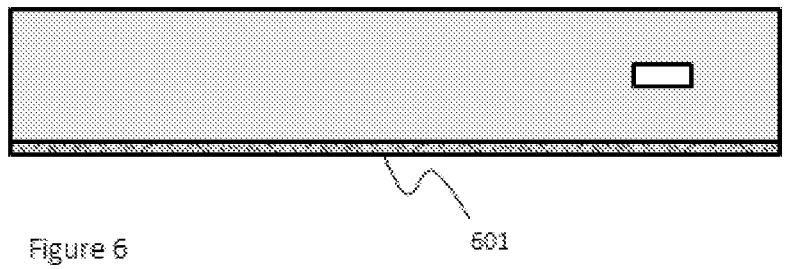
Figure 6     601
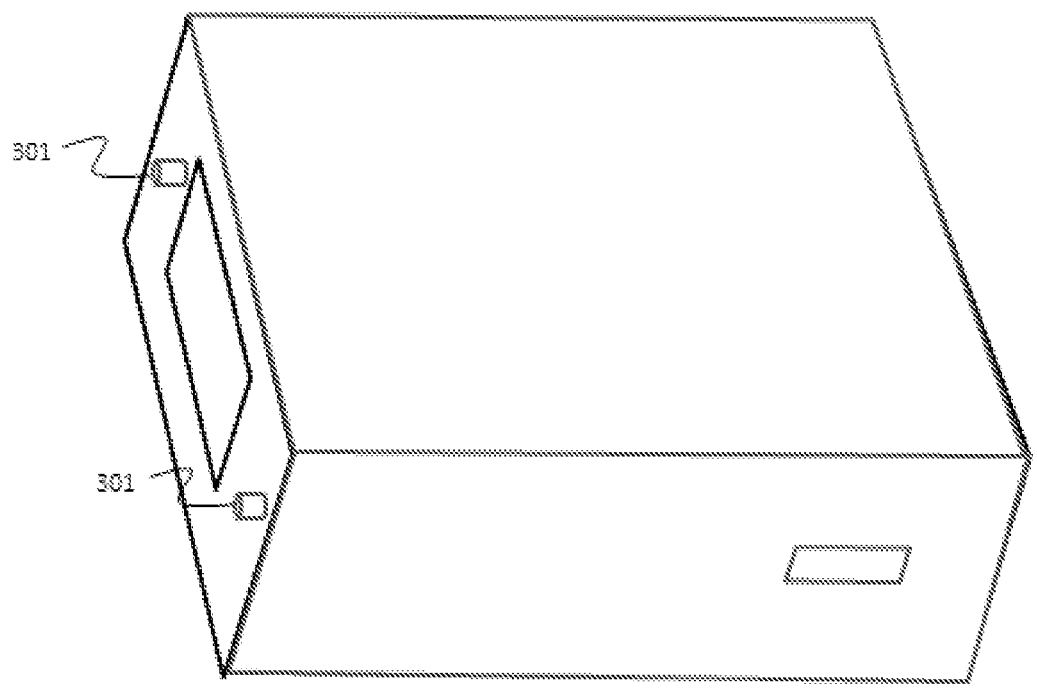
Figure 7

PROJECTOR SYSTEM

TECHNICAL FIELD

The invention is a system for projecting images on a reflective surface.

BACKGROUND OF INVENTION

It has become quite common to use a computing device in conjunction with a projection device to project a presentation, animated content or video content on a reflective-surface screen. The projection device interfaces with the computing device and receives control and data signals from the computing device enabling the projection device to produce and project the image content. Currently, such projection devices tend to be relatively large because the light source and cooling means require sufficient space within the device's enclosure.

BRIEF DESCRIPTION OF INVENTION

The invention herein disclosed and claimed makes use of micro circuitry for storing image and control data, for processing the image and control data, and for conveying image and control data to a miniature projection module. Housed in a rectangular enclosure with width and length dimensions as small as one inch and a height of a half inch determined by the largest component height. The invention can store both fixed image data and new data conveyed to it by external systems that interface with its power and data bus. Conduction cooling provided by a heat-conducting substrate provides sufficient cooling such that there is no need for a fan. The invention can interface with other systems using wired-, wireless-, or both types of networking standards. For example, it could provide communications using Ethernet, USB, Bluetooth and/or WiFi. As newer wired- and wireless-networking standards evolve, these, too, can be utilized.

BRIEF DESCRIPTION OF DRAWINGS

FIG. 6 shows a side view of the invention of FIG. 1 wherein the conducting substrate and interface aperture is illustrated.

FIG. 7 shows the three dimensional view of FIG. 5 with the addition of lens adaptors.

DETAILED DESCRIPTION OF INVENTION

The invention herein disclosed and claimed is a small projector system that can store fixed image data, and new data conveyed by an external subsystem, system or systems. Image and control data is processed by its built-in microcontroller, which can be re-programmed, and processed image and control data is conveyed to a projector module which then projects the resulting image through an aperture in the invention's enclosure.

The invention can be scaled down to one inch by one inch (length and width) and a half inch in height. Using today's field-programmable gate array (FPGA) microcircuit technology, the modules that comprise the invention are kept to relatively small dimensions without compromising storage capacity, speed, and image quality while obviating the need for active cooling by making use of a heat-conducting substrate layer.

Figure 1:
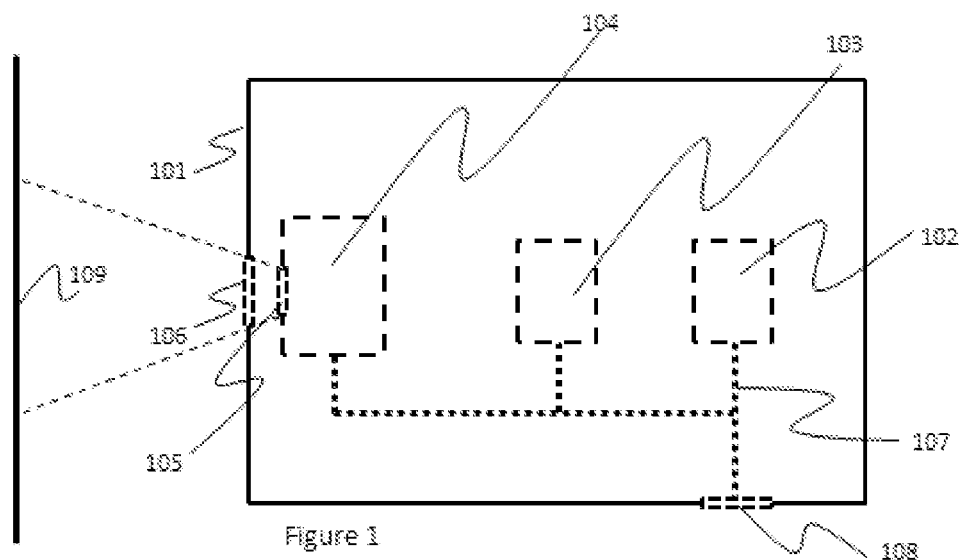
FIG. 1 illustrates a first embodiment.

FIG. 1 is an exemplary embodiment of the invention wherein the functional modules are shown as separate entities but could be further integrated into more complex modules and fewer components. The enclosure (101) can be hermetically sealed and houses a memory module (102), a microcontroller module (103) and a projector module (104). The projector module has an aperture (105) through which light can be projected, and the enclosure has a first aperture (106) enabling the light projected by the projection module to pass through the enclosure onto a target screen (109). As shown, a power and data bus (107) interconnects the functional modules allowing them convey and receive data and control signals. Furthermore, the power and data bus can be accessed externally via a port (108) supported by a second aperture on the enclosure.

Figure 2:
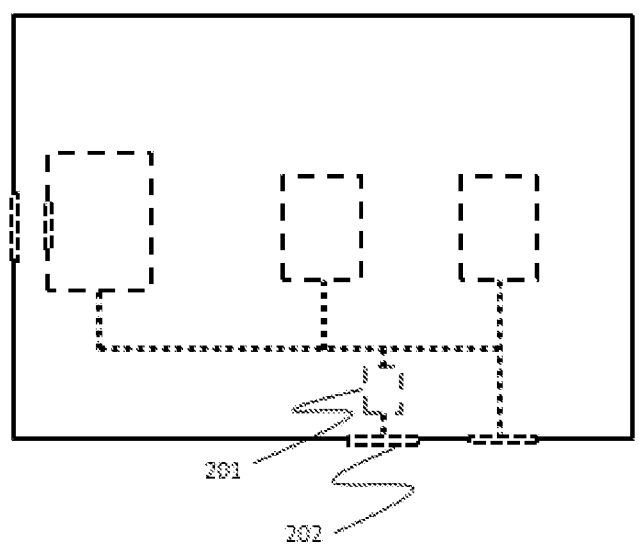
FIG. 2 illustrates another embodiment.

FIG. 2 shows the embodiment of FIG. 1 augmented with a module (201) that supports wired- or wireless-networking standards, such as Ethernet, USB, Bluetooth and WiFi. As later technologies emerge, the invention can be easily adapted to support them, as well. The module 201 conveys and receives control and image data on the aforementioned power and data bus. The module, in turn, receives wired or wirelessly conveyed image and control data via an interface (202) which is supported by the enclosure.

Figure 3:
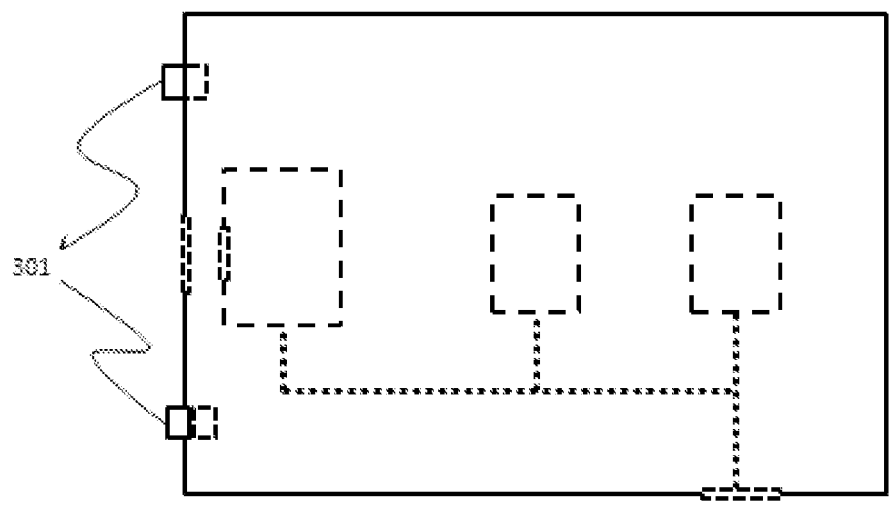
FIG. 3 shows the invention of FIG. 1 with external lens adaptors.

FIG. 3 illustrates the embodiment of FIG. 1 wherein external lens adapters (301) are attached to the enclosure on the same face as its first aperture.

Figure 4:
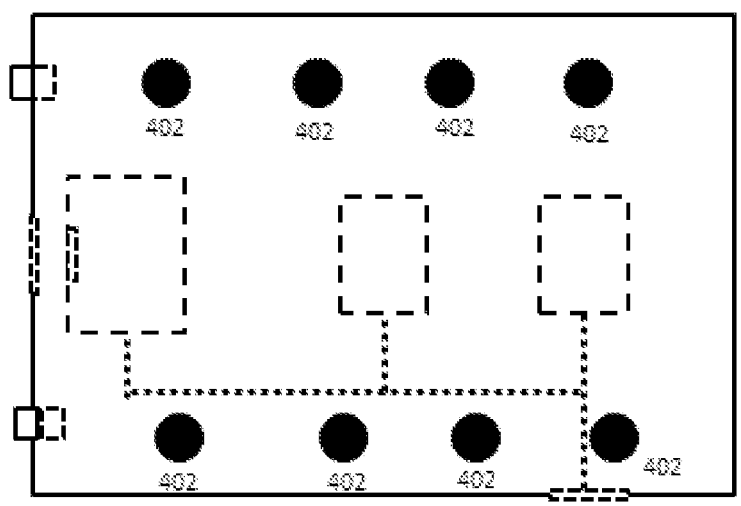
FIG. 4 shows the invention of FIG. 1 with external heat conducting fixtures.

FIG. 4 illustrates the embodiment of FIG. 1 wherein external heat-conducting fixtures (402) are added to the top face of the enclosure. These could augment the conduction cooling of the aforementioned conduction-cooling substrate.

Figure 5:
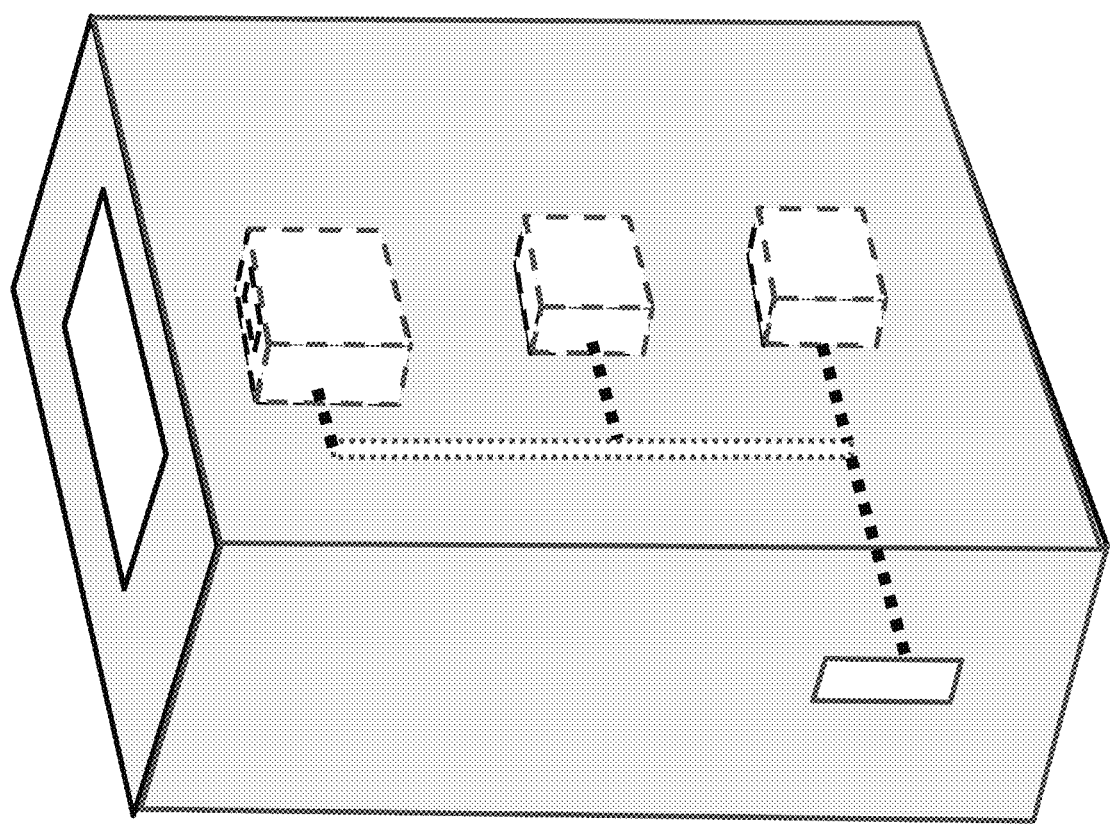
FIG. 5 shows a three-dimensional view of the embodiment of FIG. 1.

To help envision the invention in three dimensions, FIG. 5 shows the first aperture and second aperture as well as the functional modules within.

To help envision the conduction cooling substrate, FIG. 6 shows a side view of an invention embodiment wherein the layer (601) is on the bottom face of the enclosure.

FIG. 7 illustrates in three dimensions an invention embodiment wherein external lens adaptors (301) are employed.

Figure 8:
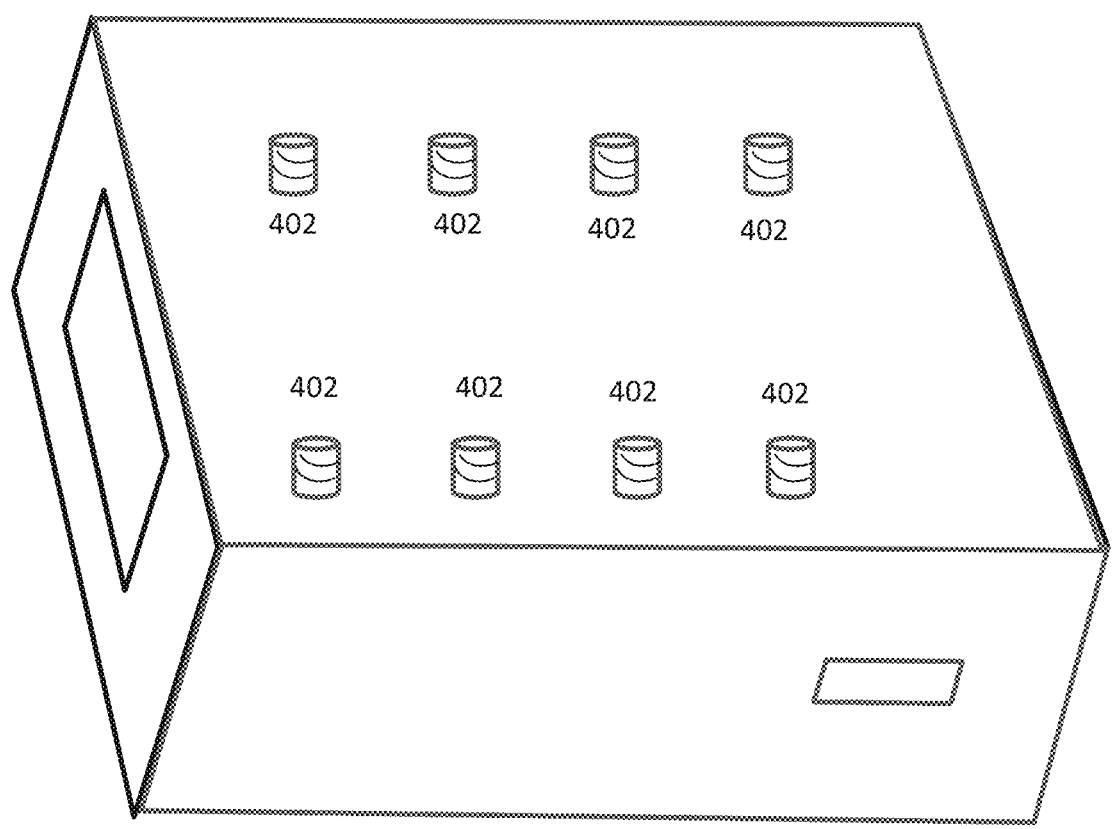
FIG. 8 shows the three dimensional view of FIG. 5 with the addition of external heat-conducting fixtures.

FIG. 8 illustrates in three dimensions an invention embodiment wherein external heat-conducting fixtures (402) are employed.

Regarding the memory module, it could comprise volatile and non-volatile memory technologies.

Regarding the microcontroller module, it would allow reprogramming via the power and data bus, or via wired- or wireless-networking technology.

Regarding the projector module, the preferred implementation is a module using laser and single mirror. Such devices do not require focusing and are energy efficient. That said, other basic types of micro projector module light sources and modulation may also be employed.

Regarding the enclosure, it can have a hollow interior; it can be epoxy potting wherein the components are surrounded by potting material which can conduct heat away from them. Dimensions are not critical. Aperture shape and sizes may be determined by the required projection characteristics and by the standard or customized interface connectors.

The conduction-cooling substrate may be sufficiently cooled using only thermal conductive copper strips. A preferred embodiment would use silicon substrates in direct contact with a thermally conductive metal.

The invention is versatile. It is a small, low-power, silent video communications device that can provide variable duration, fixed presentations. It is also a software reconfigurable router-server-smart microcontroller with embedded light engine enabling it to be adapted to changing needs of specific applications.

The drawings are exemplary and not drawn to scale. They should not be seen as limiting the scope of the invention's specifications or claims.

What is claimed is:

1. An image projection system comprising: a memory module; a programmable microcontroller module; a projector module; a power and data bus allowing said memory, programmable microcontroller and projector modules to convey and receive data and control signals; an enclosure within which resides said memory, programmable microcontroller and projector modules: and said power and data bus; said-enclosure comprises a heat-sink structure operative to absorb heat internal to said enclosure and dissipate the absorbed heat external to said enclosure; a first interface connector means enabling external power and systems to convey and receive data and control signals; said enclosure has a first aperture allowing light images produced by said projector module to be beamed outside said enclosure and projected onto a reflective surface operative to reflect light that impinges upon it so as to produce an image; said enclosure has a second aperture that supports a said first interface connector; and said first interface connector shares said power and data bus, a module supporting a wired-networking standard; said module supporting a wired-networking standard interfaces with said power and data bus; said enclosure has a third aperture that supports a second interface connector; and said second interface connector enables said module supporting a wired-networking standard to convey and receive data and control signals.

2. The image projection system as in claim 1 further comprising: a module supporting a wireless-networking standard; said module supporting a wireless-networking standard interfaces with said power and data bus; said enclosure has a third aperture that supports a second interface connector; and said second interface connector enables said module supporting a wireless-networking standard to convey and receive data and control signals.

3. The image projection system as in claim 1 further comprising at least one external lens adapter.

4. The image projection system as in claim 1 further comprising at least one external thermal conduction cooling fixture.

* * * * *